(12) United States Patent
Hsing

(10) Patent No.: US 9,329,342 B2
(45) Date of Patent: May 3, 2016

(54) OPTICAL CABLE CONNECTION CASING ADAPTED FOR OPERATION OF GUIDING AND CONNECTING OPTICAL CABLE TO BRANCHING HALFWAY

(75) Inventor: Chih-Kuang Hsing, New Taipei (TW)

(73) Assignee: Yu-Fen Chi (TW)

( * ) Notice: Subject to any disclaimer, the term of this patent is extended or adjusted under 35 U.S.C. 154(b) by 0 days.

(21) Appl. No.: 13/807,586

(22) PCT Filed: Jul. 2, 2010

(86) PCT No.: PCT/CN2010/074947
§ 371 (c)(1),
(2), (4) Date: Mar. 6, 2013

(87) PCT Pub. No.: WO2012/000206
PCT Pub. Date: Jan. 5, 2012

(65) Prior Publication Data
US 2013/0156388 A1    Jun. 20, 2013

(51) Int. Cl.
*G02B 6/255* (2006.01)
*G02B 6/44* (2006.01)
*H02G 15/013* (2006.01)
*H02G 15/115* (2006.01)

(52) U.S. Cl.
CPC ............ *G02B 6/2558* (2013.01); *G02B 6/4444* (2013.01); *G02B 6/4494* (2013.01); *H02G 15/013* (2013.01); *H02G 15/115* (2013.01); *G02B 6/4471* (2013.01); *G02B 6/4476* (2013.01)

(58) Field of Classification Search
CPC ........................... H02G 15/013; G02B 6/4444
See application file for complete search history.

(56) References Cited

U.S. PATENT DOCUMENTS

| 4,312,563 A | * | 1/1982 | Mead .............................. 385/76 |
| 5,093,886 A | * | 3/1992 | Smoker et al. ................ 385/135 |
| 5,510,576 A | * | 4/1996 | Tenace et al. ................. 174/658 |
| 6,184,467 B1 | | 2/2001 | Milanowski et al. |
| 8,050,528 B2 | * | 11/2011 | Shimirak et al. .............. 385/135 |
| 2011/0164853 A1 | * | 7/2011 | Corbille et al. ............... 385/135 |

FOREIGN PATENT DOCUMENTS

| JP | 2002139634 A | 5/2002 |
| TW | 370087 U1 | 12/2009 |
| TW | 371243 U1 | 12/2009 |
| WO | 2010047920 A2 | 4/2010 |

* cited by examiner

*Primary Examiner* — Omar R Rojas
(74) *Attorney, Agent, or Firm* — Volpe and Koenig, P.C.

(57) ABSTRACT

An optical cable connection casing includes at least one cable in-out end surface on which at least one connection part and at least one first hollow tubular column are located. The connection part and the first hollow tubular column allow the optical cable to pass in and out the connection casing through the connection part and the first hollow tubular column in the form of double optical cables after the optical cable being oppositely bent without cutting off the optical fiber core of the optical cable, respectively; wherein the optical cable will be guided and connected to a branching halfway.

20 Claims, 8 Drawing Sheets

OPTICAL CABLE CONNECTION CASING ADAPTED FOR OPERATION OF GUIDING AND CONNECTING OPTICAL CABLE TO BRANCHING HALFWAY

FIELD OF THE INVENTION

The present invention relates to an optical fiber cable enclosure applying to a branch splicing operation of the backbone cable. Particularly, an improved optical fiber cable enclosure for branch splicing operation of the backbone cable treated with waterproof treatment. The integration structure of the cable entry board and its comprehensive versatility result in enhancing the selectivity for the waterproof treatment of optical fiber cable enclosure for branch splicing operation of the backbone cable, increasing flexibility for the construction activities, reducing the cost for the telecommunication practitioner, and resolving various problems including the restricted selectivity, the inconvenience during the construction and the increased operation cost for the present technical of waterproof treatment of optical fiber cable enclosure for branch splicing operation of the backbone cable.

BACKGROUND OF THE INVENTION

The present invention relates to an optical fiber cable enclosure applying to a mid-span splicing operation of the backbone cable. Particularly, an improved optical fiber cable enclosure for mid-span splicing operation of the backbone cable treated with waterproof treatment. The integration structure of the cable entry board and its comprehensive versatility result in enhancing the selectivity for the waterproof treatment of optical fiber cable enclosure for mid-span splicing operation of the backbone cable, increasing flexibility for the construction activities, reducing the cost for the telecommunication practitioner, and resolving various problems including the restricted selectivity, the inconvenience during the construction and the increased operation cost for the present technical of waterproof treatment of optical fiber cable enclosure for mid-span splicing operation of the backbone cable.

Over the decades, the optical fiber is usually used as a splicing backbone, and most of the optical fiber cable splice enclosures are used in the straight splicing operation (combining one optical fiber which is cut off with another optical fiber having the same counts of fiber cores) and the branch splicing operation (distributing an optical fiber having more counts of fiber cores as the branch optical fiber having less counts of fiber cores). Currently, due to the advent of FTTH (fiber to the home), a large number of fibers is sent to the customer end by using the fiber equipment, such as an optical fiber cable splice enclosure. Accordingly, the optical fiber cable splice enclosure applies not only to straight splicing and branch splicing but also to a large number of mid-span splicing operation of the backbone cables (A backbone cable with more counts of core wires, while the cable is in its route and encounter users that need an optical fiber service. An optical fiber of a portion that has not be used to splice for another users to use after splicing with another different core wire by the optical fiber enclosure. The most parts of the backbone cable can not be bent, especially the optical fiber core wires are used from another user).

For the state of the art of the optical fiber cable, the cable entry board has a waterproof treatment for mid-span splicing operation of a backbone cable for accepting the entering cable splice enclosure. There are two kinds of waterproof treatment, including a mechanical processing manner and a heat-shrink processing manner, where the mechanical processing manner further has a single-piece type processing scheme, a dual-piece type processing scheme and a multiple-piece type processing scheme, and the heat-shrink processing manner can always adopt the single-piece type processing scheme. The cable entry board treated with the mechanical dual-piece type and multiple-piece type waterproof treatment has more sophisticated structure, more complex assembler and higher cost than that treated with the mechanical single-piece type waterproof treatment, and the construction quality for waterproof ability is more obvious than that of the single-piece type. The mechanical single-piece type waterproof treatment cable entry board used for mid-span splicing operation of a backbone cable has almost the same cost as compared with the heat-shrink single-piece type one. Therefore, the cable entry board with the single-piece type waterproof treatments of both the mechanical or heat-shrink manners is a preferred selection for mid-span splicing operation of a backbone cable for telecommunication practitioner.

For the aforementioned mechanical and heat-shrink single-piece type waterproof treatment cable entry boards for mid-span splicing operation of a backbone cable in the existing technology, the mechanical waterproof treatment optical fiber cable splice enclosure has advantages such as more safe, and better waterproof ability (strict construction) as compared with the heat-shrink waterproof treatment one which is suitably used as the underground cable in the ponded and waterlogged sewer system underneath. However, on the other hand, it also has shortcomings regarding requiring more components and material cost than the heat-shrink waterproof treatment one. The heat-shrink treatment optical fiber cable splice enclosure has advantages regarding requiring less components and material cost than the mechanical water proof treatment one, and has shortcomings regarding construction quality, and affecting waterproof ability, if the optical fiber inside has been bent, so that it is more suitable for use in the suspension circumstances rather than in the underground ponded and waterlogged circumstances. Accordingly, for the sake of safety, the telecommunication practitioner is capable of reducing cost by using the heat-shrink waterproof treatment optical fiber cable splice enclosure subject to the suspension circumstances. On the contrary, it is suitable for using mechanical waterproof treatment optical fiber cable splice enclosure to ensure the quality and safety for use in the underground ponded and waterlogged circumstances and the circumstances which is supposed to be far from fire.

Therefore, if an optical fiber cable splice enclosure for mid-span splicing operation of a backbone cable equipped with the single-piece type cable entry board capable of adopting not only the mechanical processing manner but also the heat-shrink processing manner to process the waterproof treatment can be provided, the above-mentioned problems which is related to costs and supposed to be resolved by using different type of waterproofed treatment cable entry boards in the optical fiber cable splice enclosure can be simply resolved by using an integral type of both mechanical and heat-shrink cable entry board in the optical fiber cable splice enclosure. In order to overcome the shortcomings existing in the current technology, the present technology utilizes the heat-shrink waterproofed component in cooperation with the waterproofed adhesive or the elastic waterproofed pad with an adhesion and a plasticity to connect with the mechanical waterproof treatment single-piece type cable entry board by a screwable manner; however, the shortcomings remain including losing integration structure for the cable entry board (the aforementioned single-piece type), increasing the complexity for components, increasing the work flow processes for screwing connection and material cost and the likes.

So, if the optical fiber cable splice enclosure in the existing technology can be improved, the shortage of waterproof treatment for mid-span splicing operation of a backbone cable can be improved, the construction quality and safety can be enhanced, and the construction maintenance and cost can be significantly reduced.

Thus, in view of and in order to overcome the drawbacks and defects arising in the prior art, "a telecommunication optical fiber cable splice enclosure having the connection part, the hollow cylindrical tube and the connected part" is thus conceived and provided by the applicant. The particular design in the present invention not only solves the problems described above, but also is easy to be implemented. Thus, the invention has the utility for the industry. The following descriptions are a brief explanation for the invention.

SUMMARY OF THE INVENTION

In order to overcome the shortcomings in the current technology, the present invention aims to provide an optical fiber cable splice enclosure for mid-span splicing operation of a backbone cable which includes at least one cable entry board; at least one connection part configured on the cable entry board wherein the backbone cable has a first segment extending through the respective connection part to form a U-turn in the optical fiber cable splice enclosure and a second segment extending through the connection part out of the optical fiber cable splice enclosure; at least one first hollow cylindrical tube connected with the respective connection part; and at least one of a heat-shrink tube and a flexible shrinkable tube, each of which has one end waterproofing a connection between the first hollow cylindrical tube and the connection part, and a second end waterproofing the first and the second segments at an external side of the cable splice enclosure. Therefore, the optical fiber cable splice enclosure, where its cable entry board of a single structure (single type) is capable entering the cable enclosure of the mid-span splicing operation of a backbone cable by using mechanical waterproof component or flexible shrinkable tube or heat-shrink tube to function as waterproof treatment. The optical fiber cable splice enclosure of the existing technology, wherein the cable entry board of single structure (single type) just has one connection part, wherein the backbone cable to be involved in the mid-span splicing operation of the backbone cable and to be waterproofed with a mechanically waterproof part, under a condition that an optical fiber core wire of the backbone cable is free from being cut, after bent, in a dual cable manner penetrates the at least one connection part so as to enter and exit by the cable enclosure; or wherein the cable entry board of single structure (single type) just has a first hollow cylindrical tube, wherein the backbone cable to be involved in the mid-span splicing operation of the backbone cable and to be waterproofed with one of a heat-shrink tube of a manifold clamp accessory, under the condition that an optical fiber core wire of the backbone cable is free from being cut, after bent, in the dual cable manner penetrates the at least one hollow cylindrical tube so as to enter and exit by the cable enclosure. Therefore, the optical fiber cable splice enclosure of the present invention uses single structure (single type) to enter and exit the cable entry board, providing the mid-span splicing operation of a backbone cable to enter the cable enclosure by using mechanical waterproof component or flexible shrinkable tube or heat-shrink tube to function as waterproof treatment. The integration structure of the cable entry board and its comprehensive versatility lead to enhancing the selection of waterproof treatment of optical fiber cable enclosure for mid-span splicing operation of the backbone cable, increasing flexibility of construction, reducing the cost of communication corporation, solving the present technical of waterproof treatment of optical fiber cable enclosure for mid-span splicing operation of the backbone cable, including selective limit, construction inconvenience, and increasing maintenance and operation cost for enterprise.

Furthermore, the optical fiber cable splice enclosure of the present invention further includes at least one first hollow cylindrical tube which is disposed on the at least one connection part. The less small volume of the optical fiber cable splice enclosure, the more convenient to collect, and more amounts of the cable entry boards, the more convenient for cable's splicing and wiring. Usually, optical fiber cable splice enclosure uses one entrance and exit of the mid-span splicing operation of a backbone cable, and more the amounts of entrance and exit (usually having 4) more better. In order to make fully use of the cable entry board with limited areas, the optical fiber cable splice enclosure of the cable entry board provide common opening for the first cylindrical tube of the mid-span splicing operation of a backbone cable and the connection part of the mid-span splicing operation of a backbone cable. Hence, the hollow cylindrical tube formed on the one connection part of the cable entry board.

Furthermore, the optical fiber cable splice enclosure of the present invention further includes at least one mechanical waterproof component configured on the connection part to form a first waterproof structure thereon and fixing the first and the second segments to form a second waterproof structure thereon. Hence, the cable enclosure of the present invention can use mechanical waterproof component to waterproof for the cable entry board of the mid-span splicing operation of a backbone cable.

The above objects and advantages of the present invention will become more readily apparent to those ordinarily skilled in the art after reviewing the following detailed descriptions and accompanying drawings, in which:

Furthermore, the optical fiber cable splice enclosure of the present invention further includes at least one manifold clamp used to urge the second end between the first and the second segments downward until the second end has a middle portion rested on a top of the first hollow cylindrical tube, wherein the respective heat-shrink tube wraps an exterior of the respective first hollow cylindrical tube after shrunk by heating and a part of the respective first and the second segments to form a third waterproof structure. Hence, the cable enclosure of the present invention can use heat-shrink tube of manifold clamp to complete the waterproof treatment for the cable entry board of the mid-span splicing operation of a backbone cable. The purpose of using the manifold clamp is to put it among the heat-shrink tube and dual cable before heat-shrink tube shrinks by heating so that the heat-shrink can wrap the dual cable tightly after shrinking.

Furthermore, the optical fiber cable splice enclosure of the present invention further includes at least one waterproofing auxiliary device, which fixes the first and the second segments and cooperates with the flexible shrinkable tube and the first hollow tube having an external end to form a fourth waterproof structure, and the flexible shrinkable tube wraps an exterior of the first hollow cylindrical tube and the waterproofing auxiliary device protruding from the external end to form a fifth waterproof structure. Hence, the cable enclosure of the present invention can use flexible shrinkable tube having filling gap waterproofing auxiliary device to complete the waterproof treatment for the cable entry board of the mid-span splicing operation of a backbone cable. The flexible shrinkable tube is made of high elongation, high tensile strength and flexible body of good flexible recovery rate. The pad with strip inside the flexible shrinkable tube has spiral pipe to enlarge the opening size. The method of waterproof uses a part of enlarged flexible shrinkable tube to cover the outside part of the first hollow cylindrical tube. The other part of enlarged flexible shrinkable tube c covers the filling gap waterproofing auxiliary device of first hollow cylindrical tube which connected with first hollow cylindrical tube that is penetrated. After drawing back the inner pad in the hard plastic spiral stripe of the flexible shrinkable tube wall, the flexible shrinkable tube becomes closely to previous enlarged smaller opening size, wherein the smaller opening size is smaller than the diameter of the first hollow cylindrical tube and filling gap waterproofing auxiliary device to form a constrictive fifth waterproof structure. The purpose of using the filling gap waterproofing auxiliary device is because of the optical fiber of the mid-span splicing of a backbone cable so that under a condition that an optical fiber core wire of the backbone cable is free from being cut, in a dual cable manner penetrates the entrance and exit of the cable of the cable entry board of the optical fiber cable splice enclosure to enter the enclosure for splicing and wiring. The gap between the dual cables is capable of wrapping the concave gap of elliptic cylinder alike or circular cylinder tightly of the forth waterproof structure after forming the shrinking of the flexible shrinkable tub by using filling gap waterproofing auxiliary device.

Furthermore, the optical fiber cable splice enclosure of the present invention further includes the first and the second segments having a fixing area, the waterproofing auxiliary device includes a pair of fixtures, each of which has an inside portion, plural fixing screws for fixing the pair of fixtures, and an adhesive material disposed on the fixtures and the fixing area to fix the first and the second segments so as to form the fifth waterproof structure.

Furthermore, the optical fiber cable splice enclosure of the present invention further includes the cable entry board has at least one second hollow cylindrical tube, through which the first and the second segments pass the optical fiber cable enclosure.

Furthermore, the optical fiber cable splice enclosure of the present invention further includes the flexible shrinkable tube and the heat-shrink tube wraps an exterior of the second hollow cylindrical tube and a portion of the first and the second segments to form a sixth waterproof structure. The optical fiber of the straight splicing and branch splicing penetrates the second hollow cylindrical tube to enter the cable enclosure in a manner of single optical fiber under a condition that an optical fiber core wire of the backbone cable is being cut, so the waterproof treatment of optical fiber using flexible shrinkable tube doesn't need to use filling gap waterproofing auxiliary device, and the waterproof treatment of optical fiber using heat-shrink tube doesn't need to use manifold clam.

Furthermore, the optical fiber cable splice enclosure of the present invention further includes at least one first fixture device therein, wherein the backbone cable includes an optical fiber core wire forming the U-turn, and the at least one fixture device is one selected from a group consisting of a ring fastener, a band fastener, a clamp joint and a combination thereof, and fixes the optical fiber core wire thereon. The transmission quality and waterproof effect of the cable splicing is affected due to the connected outside cable of the optical fiber cable splice enclosure is usually shaken or pulled by the effect of an external force and inertia. Therefore, the optical fiber cable splice enclosure of the present invention has a first fixture device to fix the cable coverage of the backbone cable so that optical cable inside the enclosure wouldn't be subject to the extended and connected cable outside the enclosure to loose, so as to enhance and ensure the cable transmission quality and waterproof effect.

Furthermore, the optical fiber cable splice enclosure of the present invention further includes at least at least one brace having an optical fiber collection disk, wherein a position of the first hollow cylindrical tube is located at a position without the possibility of causing the backbone cable being blocked and interfered by the optical fiber collection disk while the backbone cable passes the cable splice enclosure via the first hollow cylindrical tube along axis thereof. Therefore, the optical fiber cable splice enclosure with small internal space while the backbone cable enters the cable enclosure can avoid being subject to the blocking and interfering to be bent by optical fiber collection plate so as to result in poor quality of transmission. This could result in enhancing the transmission quality of the cable and miniaturizing the optical fiber cable splice enclosure.

Furthermore, the optical fiber cable splice enclosure of the present invention further includes one cable entry board mounts thereon at least one second hollow cylindrical tube, and a position of the second hollow cylindrical tube is located at a position without the possibility of causing the backbone cable being blocked and interfered by the optical fiber collection disk while the backbone cable passes the cable splice enclosure via the second hollow cylindrical tube along the axis thereof.

Furthermore, the optical fiber cable splice enclosure of the present invention further includes at least one second fixture device for fixing the at least one brace, wherein the second fixture device matches with the at least one cable entry board to provide a position for the backbone cable to pass the cable splice enclosure via the second hollow cylindrical tube along the axis thereof so as to fix the brace at the position different from that of the fiber collection disk brace. The fixture, collection, allocation and the location of the related components for backbone cable in the fiber collection plate brace have common mode and technology. Therefore, the entrance and exit of the cable is not suitable to change, when needed, it has best benefit to change the entrance and exit for backbone cable. Therefore, the optical fiber cable splice enclosure of the present invention has the second fixture device so as to provide the backbone cable to enter the cable entry board to different entrance to the enclosure. The fixture, collection, and allocation of the related optical fiber collection plate brace can operate in the existing technology so that it can reduce the adverse effects due to the change of the entrance and exit of the backbone cable, enhance the scope of application of the entrance and exit of the cable entry board, and ensure the technical quality of the related operations.

Furthermore, the optical fiber cable splice enclosure of the present invention further includes an exterior portion and at least one third fixture device, wherein the third fixture device has at least one first fixing part, having two fixing holes and two screws, and at least one second fixing part configured thereon and including a fixing component is one selected from a group consisting of a ring fastener, a band fastener, a clamp joint and a combination thereof, the first fixing part fixes the third fixing device via the two fixing holes and the two screws, the fixing component fixes the backbone cable on the exterior portion thereof, and the backbone cable extends through the first hollow cylindrical tube, has a waterproof treatment with one of the flexible shrinkable pipe and the heat-shrink tube, and is fixed to the third fixture device. The waterproof effect of waterproof structure of the cable for the cable entry board is affected owing to the connected outside cable of the optical fiber cable splice enclosure is usually shaken or pulled by the effect of an external force and inertia. Therefore, the optical fiber cable splice enclosure for its outside part of the present invention has a third fixture device to fix and connect with the cable coverage of the cable of outer waterproof structure so that the waterproof structure of the cable entry board can avoid be subject to be shaken or pulled by the outer cable of connected waterproof structure for the cable enclosure and affect its waterproof effect.

Furthermore, the optical fiber cable splice enclosure of the present invention further includes one third fixture device having at least one first fixing part fixed to the cable entry board, and at least one second fixing part, wherein the backbone cable going through the cable entry board and into the optical fiber cable splice enclosure is fixed to the second fixing part by one being selected from a group consisting of a screw, a mortise, a clamp joint, a ring fastener, a band fastener and a combination thereof.

The invention presents an optical fiber cable splice enclosure for mid-span splicing operation of a cable, wherein the splice enclosure includes a cable, including: a cable entry board; a connection part configured on the cable entry board so that the cable has a first segment extending through the connection part to form a U-turn in the cable splice enclosure and a second segment extending through the connection part out of the cable splice enclosure; a first hollow cylindrical tube connected with the connection part; and one of a heat-shrink tube and a flexible shrinkable tube, having one end waterproofing a connection among the first hollow cylindrical tube, the connection part and the cable entry board, and a second end waterproofing the first and the second segments at an external side of the cable splice enclosure.

The invention presents a cable splice enclosure for mid-span splicing operation of a cable, wherein the splice enclosure includes: a connection part, wherein the cable has a first segment extending through the connection part to form a U-turn in the cable splice enclosure and a second segment extending through the connection part out of the cable splice enclosure; a cable entry board configuring thereon the connection part passing therethrough the first and the second segments extending; and one of a heat-shrink tube and an flexible shrinkable tube, having one end waterproofing a connection between the connection part and the cable entry board, and a second end waterproofing the first and the second segments at an external side of the cable splice enclosure.

DETAILED DESCRIPTION OF THE PREFERRED EMBODIMENT

The present invention "optical fiber cable splice enclosure for mid-span splicing operation of backbone cable" is exemplarily described by reference to the preferred embodiments and examples, which renders a person having ordinary skill in the art to achieve the present invention accordingly. It is to be understood that these examples are intended in an illustrative rather than in a limiting sense. It is contemplated that modifications and combinations will readily occur to those skilled in the art, which modifications and combinations will be within the spirit of the invention.

Embodiment 1

Figure 1:
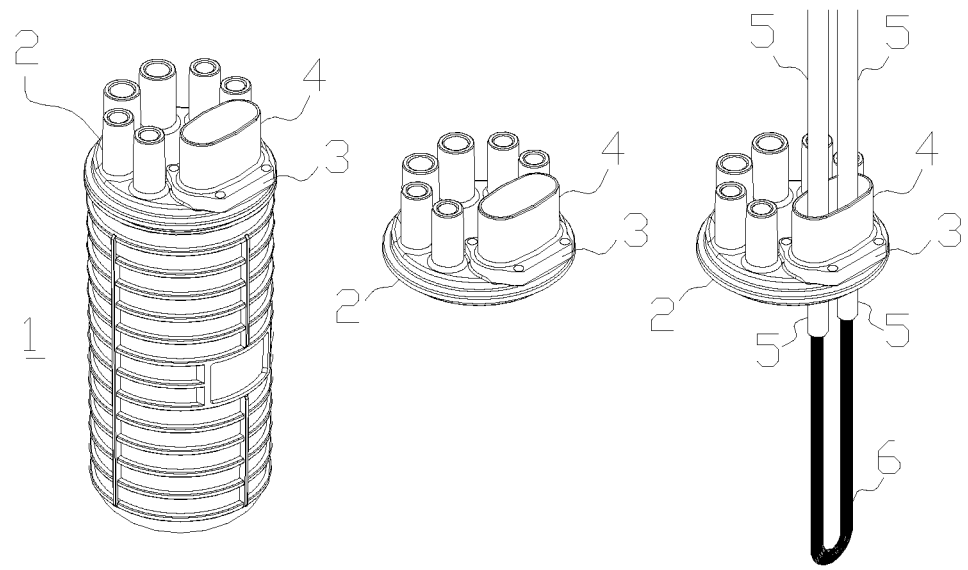
FIG. 1(A) to FIG. 1(B) are the schematic diagrams illustrating the optical fiber cable enclosure 1 suitable for the backbone cable for the mid-span splicing operation and having the cable entry board 2 for use in the embodiment 1 in accordance with the present invention.
Figure 1:
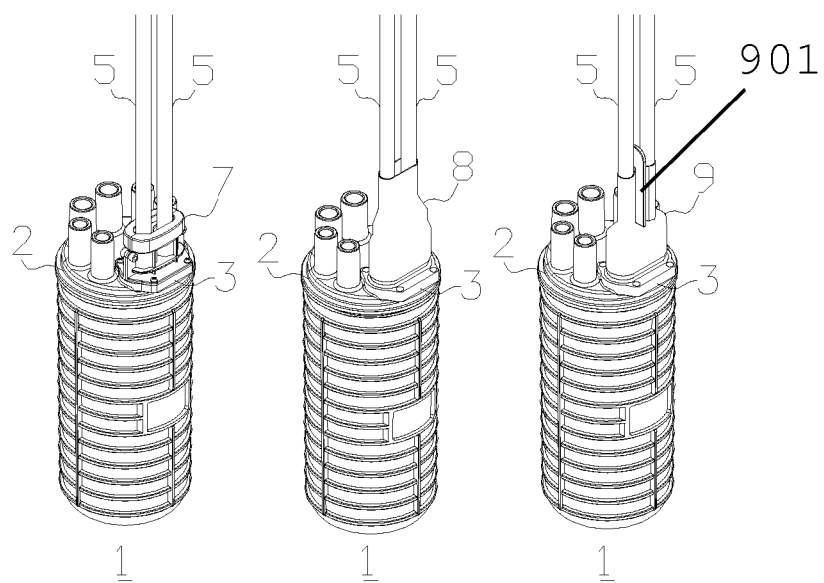

Please referring to FIG. 1(A) to FIG. 1(B), which are the schematic diagrams illustrating the optical fiber cable enclosure (housing, casing, shell, closure) 1 suitable for the backbone cable for the mid-span splicing operation and having the cable entry board 2 for use in the embodiment 1 in accordance with the present invention. The cable entry board 2 is formed to have a connection part 3 and a first hollow cylindrical tube 4. The first hollow cylindrical tube 4 has an integrated structure which is formed on the inner edge of the connection part 3 integratedly formed with the connection part 3. The optical fiber 5 having an optical fiber core wire 6 to be involved in the backbone cable for the mid-span splicing operation can be bent subject to a condition that an optical fiber core wire 6 of the backbone cable is free from being cut off. After bent, the optical fiber core wire 6 is folded in a dual cable formation and penetrates both the first hollow cylindrical tube 4 and the connection part 3 and then enters into the cable enclosure 1 in FIG. 1(A). One of either the mechanical waterproof component 7, the flexible shrinkable tube 8 or the heat-shrink tube 9 can be selected to function as the waterproof treatment for the backbone cable 5 for the mid-span splicing in the embodiment 1. The method of the embodiment is disclosed as follows.

Figure 2:
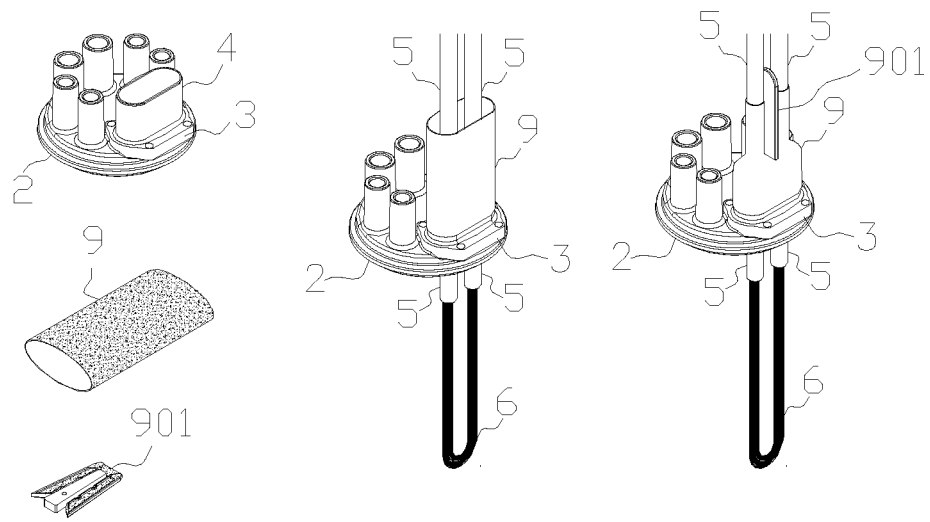
FIG. 2 is a schematic diagram illustrating using the heat-shrink tube 9 to function as the waterproof treatment for the backbone cable 5 for the mid-span splicing operation in the present embodiment 1.

Please referring to FIG. 2, which is a schematic diagram illustrating using the heat-shrink tube 9 to function as the waterproof treatment for the backbone cable 5 for the mid-span splicing operation in the present embodiment 1. When using the heat-shrink tube 9 to function as the waterproof treatment for the backbone cable 5 for the mid-span splicing operation, it additionally requires the manifold clamp 901. After heating the heat-shrink tube 9 and the manifold clamp 901 on the backbone cable 5 for the mid-span splicing operation and covering the first hollow cylindrical tube 4 and penetrating the first hollow cylindrical tube 4 into the cable enclosure 1, the heat-shrink tube 9 is tightly shrunk to wrap an exterior of the first hollow cylindrical tube 4 and partly wrap an exterior of the backbone cable 5 for the mid-span splicing operation which penetrates the first hollow cylindrical tube 4 and enters into the cable enclosure 1, so as to form a third waterproof structure. The waterproof treatment for the backbone cable 5 for the branch mid-span splicing operation and the cable entry board 2 is completed.

Figure 3:
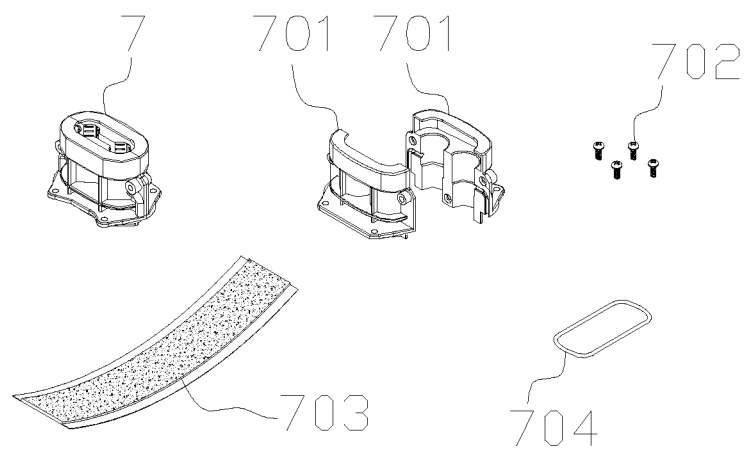
FIG. 3(A) to FIG. 3(D) are the schematic diagrams illustrating using the mechanical waterproof component 7 to function as the waterproof treatment for the backbone cable 5 for the mid-span splicing operation in the present embodiment 1.
Figure 3:
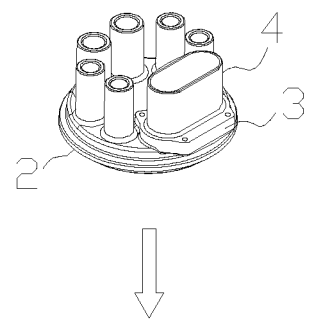
Figure 3:
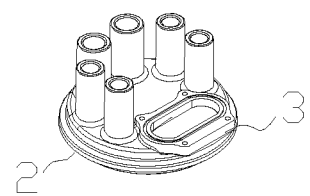
Figure 3:
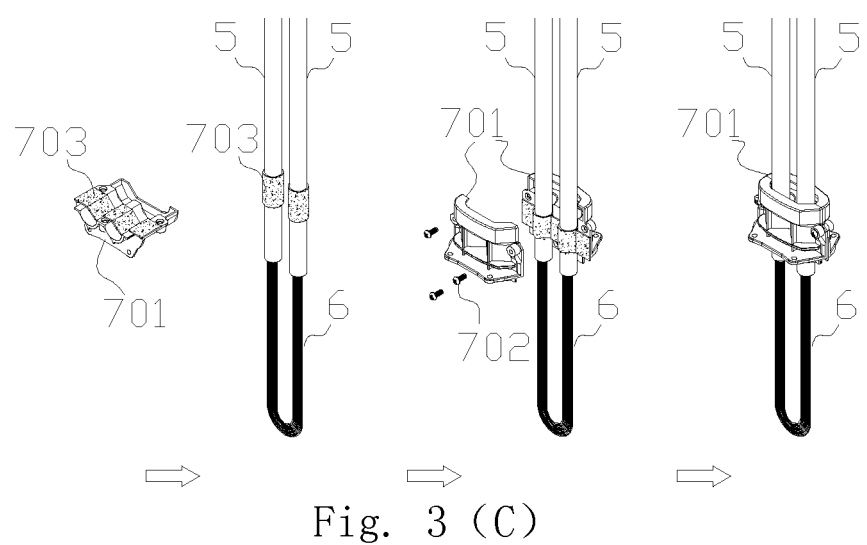
Figure 3:
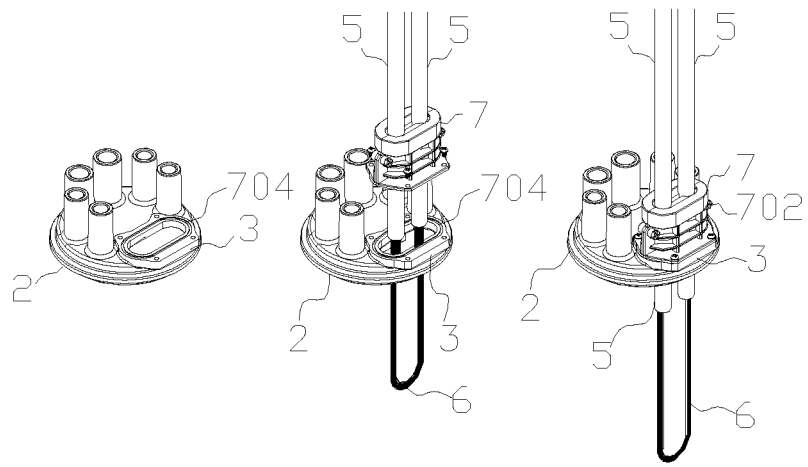

Please referring to FIG. 3(A) to FIG. 3(D), which are the schematic diagrams illustrating using the mechanical waterproof component 7 to function as the waterproof treatment for the backbone cable 5 for the mid-span splicing operation in the present embodiment 1. The mechanical waterproof component 7 in the present embodiment 1 includes two pieces of constrictive outer enclosure 701, the pressing screw 702, a waterproof tape 703 with adhesion and plasticity and an elastic waterproof pad 704 (as shown in FIG. 3(A)). When using the mechanical waterproof component 7 to function as the waterproof treatment for the backbone cable 5 for the mid-span splicing operation under a condition without damaging the connection part 3, the integration structure of the first hollow cylindrical tube 4 formed on the inner edge of the connection part 3 of the cable entry board 2 is to be removed (as shown in FIG. 3(B)). Then the waterproof tape 703 is placed in one side of the dual concave sinks for containing dual optical fibers on the constrictive outer enclosure 701. The waterproof tape 703 tightly wraps at the junction of the U-turn optical fiber and the constrictive outer enclosure 701, wherein the optical fiber core wire 6 inside the U-turn optical fiber of the backbone cable 5 used for the mid-span splicing operation penetrating the connection part 3 and entering into the cable enclosure 1 is not cut off. The pressing screw 702 is used to lock the pair of pieces of the constrictive outer enclosure 701 to form a first waterproof structure (as shown in FIG. 3(C)). Next, the elastic waterproof pad 704 is placed on the position where the connection part 3 is ready to be combined with constrictive outer enclosure 701, and the backbone cable 5 for the mid-span splicing operation is penetrated through the connection part 3 into the cable enclosure 1. Next, the constrictive outer enclosure 701 is combined with the connection part 3 by the screwable manner to form a tighten second waterproof structure (as shown in FIG. 3(D)). The waterproof treatment for the backbone cable 5 for the mid-span splicing operation and the cable entry board 2 is completed.

Figure 4:
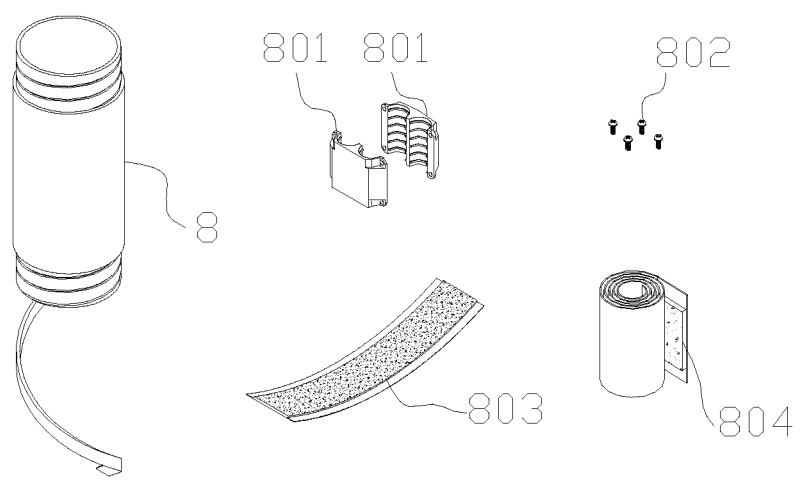
FIG. 4(A) to FIG. 4(C) are schematic diagrams illustrating using the flexible shrinkable tube 8 to function as the waterproof treatment for backbone cable 5 for the mid-span splicing operation in accordance with the present embodiment 1.
Figure 4:
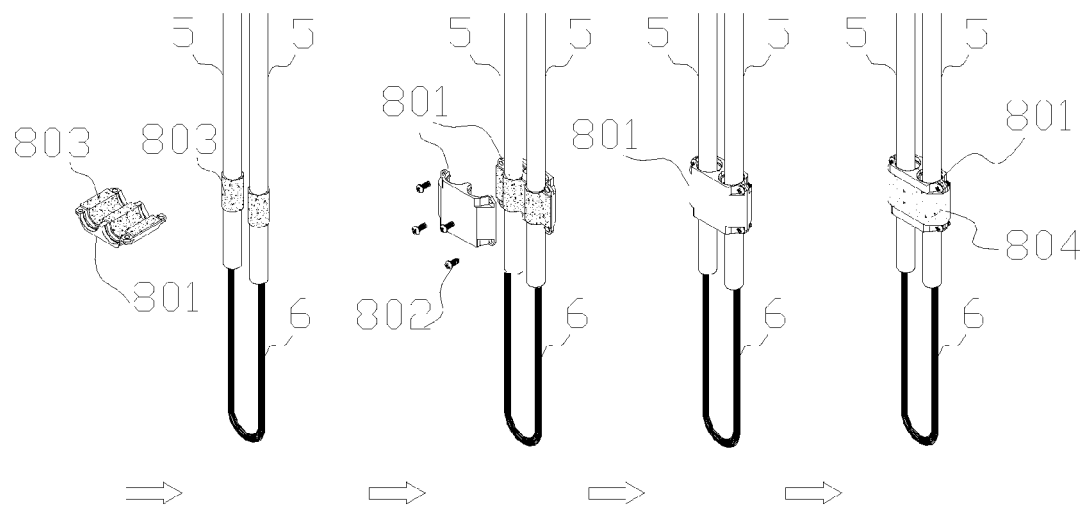
Figure 4:
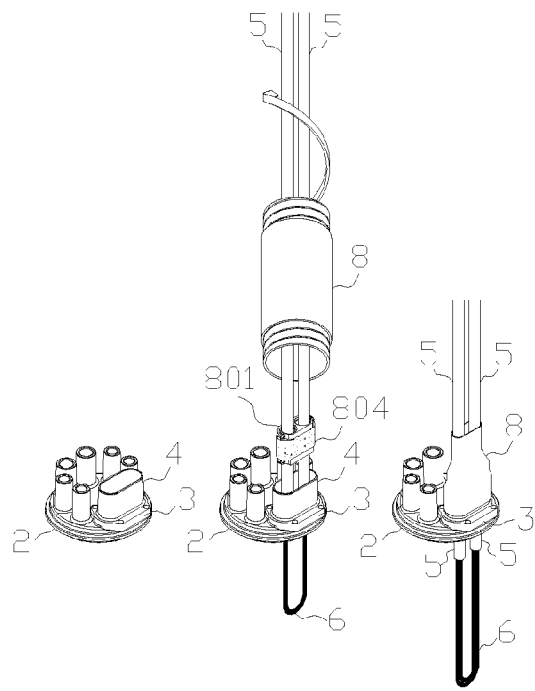

Please referring to FIG. 4(A) to FIG. 4(C), which are schematic diagrams illustrating using the flexible shrinkable tube 8 to function as the waterproof treatment for backbone cable 5 for the mid-span splicing operation in accordance with the present embodiment 1. When using the flexible shrinkable tube 8 to function as the waterproof treatment for the backbone cable 5 for the mid-span splicing operation, the first hollow cylindrical tube 4 on the inner edge of the connection part 3 is not required to be removed, but the flexible shrinkable tube 8 and the gap-filling waterproofing auxiliary device are required to be used. The gap-filling waterproofing auxiliary device in the present embodiment 1 includes two pieces of semi-elliptical constrictive outer enclosure 801 with dual concave sinks for containing dual optical fibers, a pressing screw 802, the adhesive and plastic waterproof tape with double adhesive sides 803, and the elastic waterproof pad 804 with single adhesive side (as shown in FIG. 4(A)). Place the waterproof tape with double adhesive sides 803 on one piece of semi-elliptical constrictive outer enclosure 801 with dual concave sinks for containing dual optical fibers, the waterproof tape with double adhesive sides 803 wraps at the junction of the U-turn optical fiber and the semi-elliptical constrictive outer enclosure 801, wherein the optical fiber core wire 6 inside the U-turn optical fiber of the backbone cable 5 used for the mid-span splicing operation penetrating the first hollow cylindrical tube 4 and entering into the cable enclosure 1 is not cut off. Next, the pressing screw 802 is used to lock the semi-elliptical constrictive outer enclosure 801 tightly so as to form an elliptical waterproof structure. Next, the remaining and squeezed-out portion of the adhesive and plastic waterproof tape with double adhesive sides 803 owing to being tightly locked is removed from the semi-elliptical constrictive outer enclosure 801 with dual concave sinks for containing dual optical fibers. Next, the elastic waterproof pad 804 with single adhesive side wraps the outer side of the semi-elliptical constrictive outer enclosure 801 with dual concave sinks for containing dual optical fibers, whereby the forth waterproof structure (as shown in FIG. 4 (B)) is formed within the semi-elliptical constrictive outer enclosure 801 with dual concave sinks for containing dual optical fibers. Next, the flexible shrinkable tube 8 covers the backbone cable 5 formed with the fourth waterproof structure for the mid-span splicing operation and prepared to be treated with the waterproof treatment with the flexible shrinkable tube 8. The backbone cable 5 formed with the formed fourth waterproof structure is bent to form a U-turn configuration and is sent to pass through the first hollow cylindrical tube 4 into the cable enclosure and then is fixed on the cable enclosure 1. The flexible shrinkable tube 8 is then used to wrap the outer part of the first hollow cylindrical tube 4, and the elliptical cylindrical tube not penetrating the first hollow cylindrical tube 4 of the fourth waterproof structure, so as to form a fifth structure (FIG. 4(C)). The waterproof treatment between the backbone cable 5 for the mid-span splicing operation and the cable entry board 2 is completed.

Figure 5:
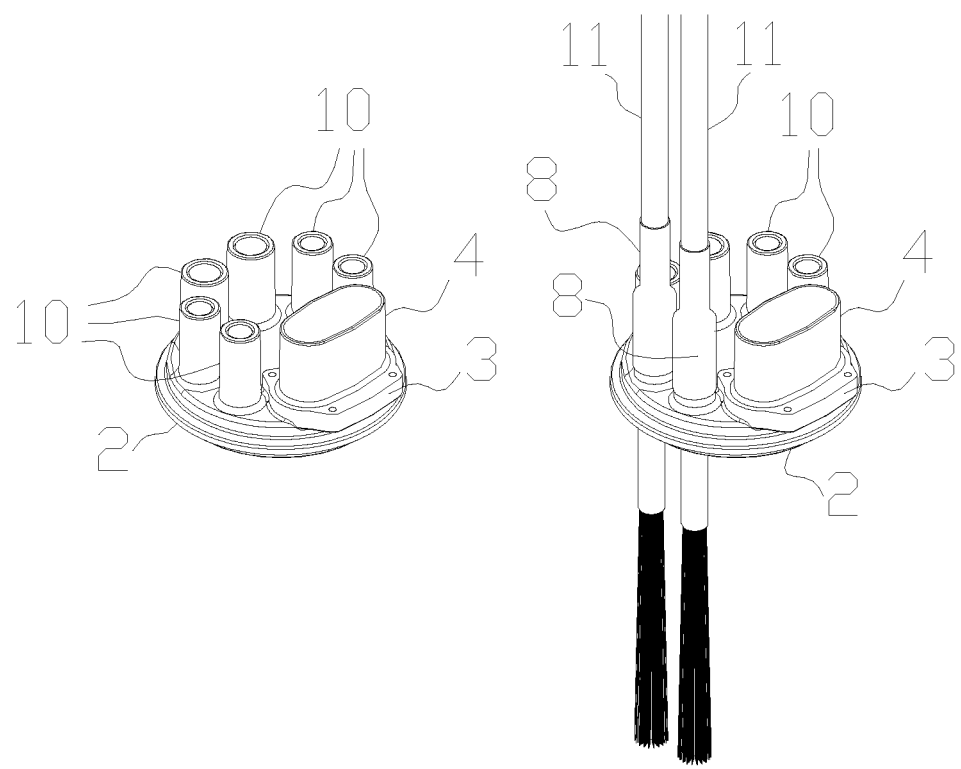
FIG. 5 is a schematic diagram illustrating the cable entry board 2 of the optical fiber enclosure 1 suitable for the mid-span splicing operation for use in the embodiment 1 in accordance with the present invention.

Please referring to FIG. 5, which is a schematic diagram illustrating the cable entry board 2 of the optical fiber enclosure 1 suitable for the mid-span splicing operation for use in the embodiment 1 in accordance with the present invention. The cable entry board 2 has six second hollow cylindrical tubes 10 providing the optical fiber cable 11 for the straight splicing operation and the mid span branch splicing operation to pass through the cable enclosure 1. The second hollow cylindrical tubes 10, which can be selected as a flexible shrinkable tube 8 (or a heat-shrink tube 9 as well), wraps the outer part of the second hollow cylindrical tubes 10 as well as wraps a portion of the optical fiber cable 11 of the outer part of the second hollow cylindrical tube 10 that passes through the second hollow cylindrical tube to connect with the cable enclosure 1, so as to form a waterproof structure (FIG. 5). If the second hollow cylindrical tube 10 and the optical fiber cable 11 have a relatively smaller diameter or is scratched, the elastic waterproof tape 804 with single adhesive side can be used to wrap to expand the diameter to be fit with the size of the flexible shrinkable tube 8 to fill the scratches.

Figure 6:
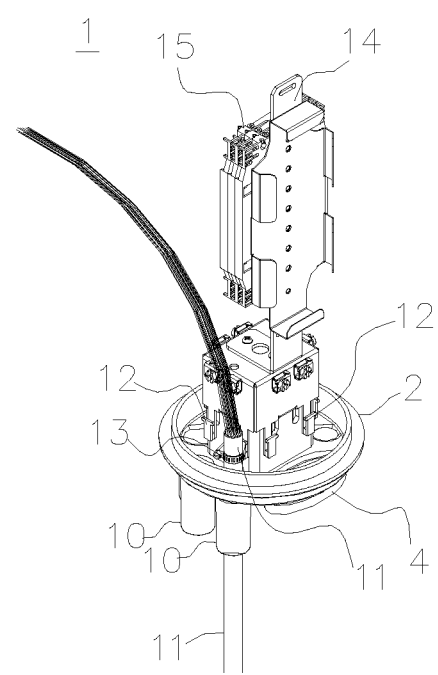
FIG. 6 is a schematic diagram illustrating the interior of the optical fiber cable enclosure 1 suitable for the backbone cable for the mid-span splicing operation for use in the embodiment 1 in accordance with the present invention.

Please referring to FIG. 6, which is a schematic diagram illustrating the interior of the optical fiber cable enclosure 1 suitable for the backbone cable for the mid-span splicing operation for use in the embodiment 1 in accordance with the present invention. Inside the optical fiber enclosure 1, there disposes a first fixture device 12, wherein the first fixture device 12 uses the stainless steel ring fastener 13 to fix the introducing optical fiber cable 11 at the first fixture device 12.

Figure 7:
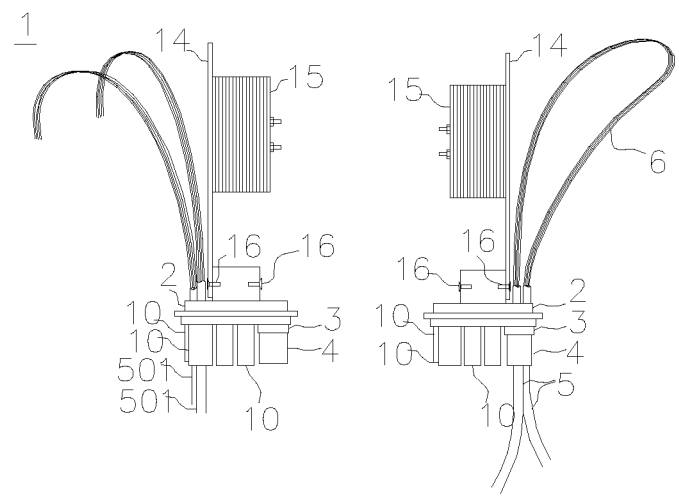
FIG. 7 is a schematic diagram illustrating the interior of the optical fiber cable enclosure 1 suitable for the backbone cable for the mid-span splicing operation for use in the embodiment 1 in accordance with the present invention.

Please referring to FIG. 7, which is a schematic diagram illustrating the interior of the optical fiber cable enclosure 1 suitable for the backbone cable for the mid-span splicing operation for use in the embodiment 1 in accordance with the present invention. Inside the optical fiber enclosure 1, there disposes an optical fiber collection disk brace 14. The positions where the first cylindrical tube 4 and the second cylindrical tube 10 situate on the cable entry board 2 for respectively providing the backbone cable 5 for the mid-span splicing operation to pass through and providing the backbone cable for straight splicing operation 501 to pass through, are allocated at a straight route after entering into the optical fiber cable enclosure 1 for the backbone cable 5, 501, which are not blocked and interfered by the optical fiber collection disk 15 on the optical fiber collection disk brace 14. there is a second fixture device 16 disposed inside the optical fiber cable enclosure 1 for fixing the optical fiber collection disk brace 14. The second fixture device 16 can fix the optical fiber collection disk brace 14 at different position in correspondence with the entrance and exit of the cable entry board 2 for the backbone cable 5, 501 to pass through, and to (as shown in FIG. 7). In addition, the optical fiber cable splice enclosure 1 suitable for the mid-span splicing operation for use in the embodiment 1 in accordance with the present invention, the entrance and exit position where the second hollow cylindrical tube 10 situate on the cable entry board 2 for the branch splicing optical fiber cable 11 to pass through is allocated at a straight route after entering into the optical fiber cable enclosure 1 for the optical fiber 6, which are not blocked and interfered by the optical fiber collection disk 15 on the optical fiber collection disk brace 14. (as shown in FIG. 6)

Figure 8:
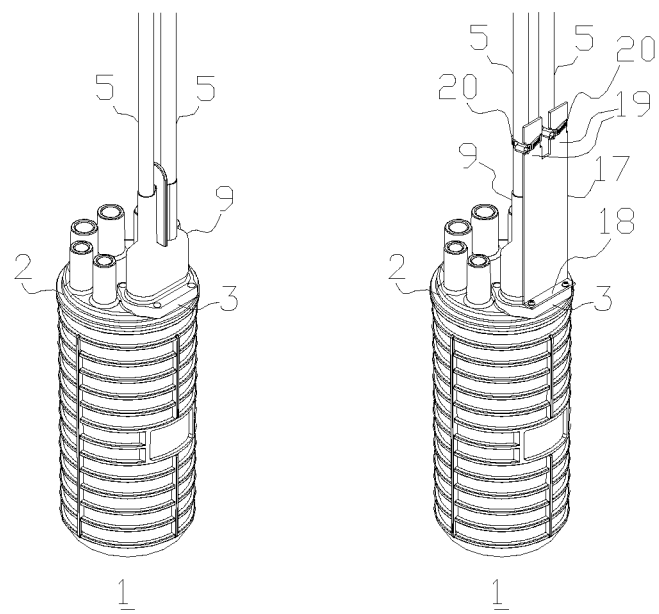
FIG. 8 is a schematic diagram illustrating optical fiber cable splice enclosure 1 suitable for the backbone cable for the mid-span splicing operation for use in the embodiment 1 in accordance with the present invention.

Please referring to FIG. 8, which is a schematic diagram illustrating optical fiber cable splice enclosure 1 suitable for the backbone cable for the mid-span splicing operation for use in the embodiment 1 in accordance with the present invention. When the heat-shrink tube 9 is functioned as the waterproof treatment for the backbone cable 5 for the branch mid-span splicing operation, a third fixture device 17 on the outer part of the cable enclosure 1 is utilized to fix the optical fiber to be processed with the waterproof treatment by heat-shrink tube 9 and passing through the first cylindrical tube 4, wherein the third fixture device 17 includes a first fixing part 18 and a second fixing part 19 connected with the first fixing part 18. The first fixing part 18 fixes the third fixture device 17 within two screw fixing holes on the outer side of the connection part 3 of the cable entry board 2 by using the screwable manner. The second fixture device 19 fixes the optical fiber 5 outside the waterproof structure of the heat-shrink tube 9 on the third fixture device 17 by using stainless steel ring fastener 20 so as to avoid the loosing of the waterproof structure of the heat-shrink tube 9 of the cable entry board 2 which is affected by the bending of the optical fiber 5 connected with the outer part of the cable enclosure 1, while the optical fiber cable enclosure 1 is moved.

Embodiment 2

Figure 9:
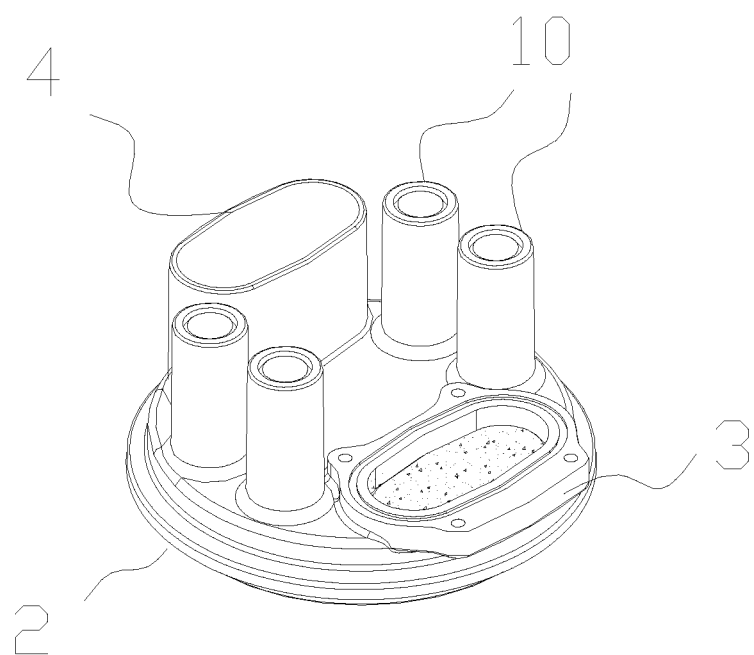
FIG. 9 is a schematic diagram illustrating the optical fiber cable splice enclosure 1 suitable for the backbone cable for the mid-span splicing operation for use in the embodiment 1 in accordance with the present invention.

Please referring to FIG. 9, which is a schematic diagram illustrating the optical fiber cable splice enclosure 1 suitable for the backbone cable for the mid-span splicing operation for use in the embodiment 1 in accordance with the present invention. The difference between the embodiment 1 and embodiment 2 is that the connection part 3 and the first cylindrical tube 4 formed on the cable entry board 2 can also be formed on the different position respectively.

From the above descriptions of Embodiments 1 and 2, the present invention provides a telecommunication optical fiber cable splice enclosure having the connection part, the hollow cylindrical tube and the connected part and the enclosure can effectively improve the existing technology, for overcoming the defects such as poor function, high cost, inconsistent construction quality and unsafe construction etc. Therefore, the present invention enhances the whole function, increases the construction quality and safety, and significantly reduces the cost for construction and maintenance for the related practitioner.

While the invention has been described in terms of what is presently considered to be the most practical and preferred Embodiments, it is to be understood that the invention needs not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A cable splice enclosure for a mid-span splicing operation of a backbone cable, comprising:
 a cable entry board;
 a connection part configured on the cable entry board and having a fixing element; and
 a first hollow cylindrical tube formed on the connection part, wherein:
  when the first hollow cylindrical tube is removed from the connection part in one instance, a mechanical waterproof component is fixed with the connection part on the cable entry board via the fixing element to waterproof a connection between the backbone cable and an external side of the cable splice enclosure; and
  when the first hollow cylindrical tube remains on the connection part in a different instance, the connection between the backbone cable and the external side of the cable splice enclosure is waterproofed with one of a heat-shrink tube and a flexible shrinkable tube.

2. The cable splice enclosure as claimed in claim 1, wherein the backbone cable has a first segment extending through the connection part to form a U-turn in the cable splice enclosure and a second segment extending through the connection part out of the cable splice enclosure.

3. The cable splice enclosure as claimed in claim 2, further comprising at least one of a heat-shrink tube and a flexible shrinkable tube, each of which has one end waterproofing the connection part, and a second end waterproofing the first and the second segments at the external side of the cable splice enclosure.

4. The cable splice enclosure as claimed in claim 3, further comprising at least one mechanical waterproof component configured on the connection part to form a first waterproof structure thereon and fixing the first and the second segments to form a second waterproof structure thereon.

5. The cable splice enclosure as claimed in claim 4, wherein the first and the second segments have a fixing area, and the mechanical waterproof component comprises a pair of fixtures each of which has an inside portion, plural fixing screws for fixing the pair of fixtures, one of a waterproof glue having characteristics of adhesion and plasticity and an adhesive material to be disposed on the fixtures and the fixing area to form the second waterproof structure, and an elastic waterproof pad disposed on the connection part to form the first waterproof structure.

6. The cable splice enclosure as claimed in claim 3, wherein the connection part and the first hollow cylindrical tube form a connection being waterproofed by the one end.

7. The cable splice enclosure as claimed in claim 6, further comprising at least one manifold clamp urging the second end between the first and the second segments downward until the second end has a middle portion rested on a top of the first hollow cylindrical tube, wherein the heat-shrink tube wraps an exterior of the first hollow cylindrical tube after shrunk by heating and a part of the first and the second segments to form a third waterproof structure.

8. The cable splice enclosure as claimed in claim 6, further comprising at least one waterproofing auxiliary device, which fixes the first and the second segments and cooperates with the flexible shrinkable tube and the first hollow tube having an external end to form a fourth waterproof structure, wherein the flexible shrinkable tube wraps an exterior of the first hollow cylindrical tube and the waterproofing auxiliary device protruding from the external end to form a fifth waterproof structure.

9. The cable splice enclosure as claimed in claim 8, wherein the first and the second segments have a fixing area, the waterproofing auxiliary device comprises a pair of fixtures, each of which has an inside portion, plural fixing screws for fixing the pair of fixtures, and one of a waterproof glue having characteristics of adhesion and plasticity and an adhesive material to be disposed on the fixtures and the fixing area to fix the first and the second segments so as to form the fifth waterproof structure.

10. The cable splice enclosure as claimed in claim 6, wherein the cable entry board has at least one second hollow cylindrical tube, through which the first and the second segments pass the cable splice enclosure.

11. The cable splice enclosure as claimed in claim 10, wherein the one of flexible shrinkable tube and the heat-shrink tube wraps an exterior of the second hollow cylindrical tube and a portion of the first and the second segments to form a sixth waterproof structure.

12. The cable splice enclosure as claimed in claim 6, further comprising at least one first fixture device therein, wherein the backbone cable includes an optical fiber core wire forming the U-turn, and the at least one fixture device is one selected from a group consisting of a ring fastener, a band fastener, a clamp joint and a combination thereof, and fixes the optical fiber core wire thereon.

13. The cable splice enclosure as claimed in claim 12, further comprising therein at least one brace having an optical fiber collection disk, wherein the first hollow cylindrical tube is located on the connection part at a position without the possibility of causing the backbone cable being blocked and interfered by the optical fiber collection disk while the backbone cable passes the cable splice enclosure via the first hollow cylindrical tube along the axis thereof.

14. The cable splice enclosure as claimed in claim 13, wherein the at least one cable entry board mounts thereon at least one second hollow cylindrical tube, and the second hollow cylindrical tube is located on the connection part at a position without the possibility of causing the backbone cable being blocked and interfered by the optical fiber collection disk while the backbone cable passes the cable splice enclosure via the second hollow cylindrical tube along the axis thereof.

15. The cable splice enclosure as claimed in claim 14, further comprising therein at least one second fixture device for fixing the at least one brace, wherein the second fixture device matches with the at least one cable entry board to provide a first position for the backbone cable to pass the cable splice enclosure via the second hollow cylindrical tube along the axis thereof so as to fix the brace at a second position different from the first position.

16. The cable splice enclosure as claimed in claim 15, wherein the cable splice enclosure comprises an exterior portion and at least one third fixture device, wherein the third fixture device has at least one first fixing part having two fixing holes and two screws, and at least one second fixing part configured thereon and including a fixing component being one selected from a group consisting of a ring fastener, a band fastener, a clamp joint and a combination thereof, the first fixing part fixes the third fixing device via the two fixing holes and the two screws, the fixing component fixes the backbone cable on the exterior portion thereof, and the backbone cable extends through the first hollow cylindrical tube, has a waterproof treatment with the one of the flexible shrinkable tube and the heat-shrink tube, and is fixed to the third fixture device.

17. The cable splice enclosure as claimed in claim 16, wherein the at least one first fixing part is fixed to the cable entry board, and the backbone cable going through the cable entry board and into the cable splice enclosure is fixed to the at least one second fixing part by one being selected from a group consisting of a screw, a mortise, a clamp joint, a ring fastener, a band fastener and a combination thereof.

18. A cable entry board for a cable splice enclosure, comprising:
a connection part having a fixing element; and
a first hollow cylindrical tube formed on the connection part, wherein:
when the first hollow cylindrical tube is removed from the connection part in one instance, a mechanical waterproof component is fixed with the connection part of the cable entry board via the fixing element to waterproof a connection between a cable and an external side of the cable splice enclosure; and
when the first hollow cylindrical tube is kept on the connection part in a different instance, the connection between the cable and the external side of the cable splice enclosure is waterproofed with one of a heat-shrink tube and a flexible shrinkable tube.

19. A cable splicing method for splicing a cable in a cable splice enclosure, comprising:
providing a cable entry board on the cable splice enclosure;
configuring on the cable entry board a connection part having a fixing element;
forming a first hollow cylindrical tube on the connection part;
when a mechanical waterproof component is used in a first instance to waterproof a connection between the cable and an external side of the cable splice enclosure, removing the first hollow cylindrical tube and fixing the mechanical waterproof component with the cable entry board via the fixing element; and
when one of a heat-shrink tube and a flexible shrinkable tube is used in a second instance, using the one to waterproof the connection between the cable and the external side of the cable splice enclosure.

20. The cable splicing method as claimed in claim 19, wherein the cable has a first segment and a second segment in the cable splice enclosure, further comprising steps of:
passing the first segment through the connection part to form a U-turn in the cable splice enclosure; and
passing the second segment through the connection part out of the cable splice enclosure.

* * * * *